(12) United States Patent
Berding

(10) Patent No.: US 6,975,476 B1
(45) Date of Patent: Dec. 13, 2005

(54) DISK DRIVES AND HOST DEVICES INCLUDING A RESETABLE SHOCK SENSOR

(75) Inventor: Keith R. Berding, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 154 days.

(21) Appl. No.: 10/376,832

(22) Filed: Feb. 28, 2003

(51) Int. Cl.[7] .............................................. G11B 15/18
(52) U.S. Cl. ........................................ 360/69; 360/31
(58) Field of Search .......................... 360/69, 75, 105, 360/106, 31, 78.01, 78.04; 73/1.38, 489, 73/494, 496

(56) References Cited

U.S. PATENT DOCUMENTS

| | | | |
|---|---|---|---|
| 4,532,486 A * | 7/1985 | Terrier | 335/13 |
| 5,149,926 A * | 9/1992 | Ono | 200/61.45 M |
| 6,520,013 B1 * | 2/2003 | Wehrenberg | 73/489 |
| 6,771,449 B1 * | 8/2004 | Ito et al. | 360/75 |

* cited by examiner

Primary Examiner—David Hudspeth
Assistant Examiner—Jason Olson
(74) Attorney, Agent, or Firm—Alan W. Young, Esq.

(57) ABSTRACT

Disclosed herein are disk drives and mobile host devices that include a resetable shock sensor. A mobile host device may include a memory device configured to receive a shock event signal and a shock sensor. The shock sensor may be coupled to the memory device and is configured to generate the shock event signal. The shock sensor includes a fixed portion, and a movable portion responsive to shock events. The movable portion is configured to remain out of contact with the fixed portion until the mobile host device is subjected to a shock event greater than a predetermined magnitude and to contact and remain in contact with the fixed portion and to generate the shock event signal after the mobile host device is subjected to a shock event greater than the predetermined magnitude.

28 Claims, 4 Drawing Sheets

DISK DRIVES AND HOST DEVICES INCLUDING A RESETABLE SHOCK SENSOR

BACKGROUND OF THE INVENTION

1. Field of the Invention

The present invention relates to disk drives and to mobile host devices that may contain disk drives. More particularly, the present invention relates to disk drives and mobile host devices that include a resetable shock sensor.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a read/write head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar airflow above its surface that lifts the head away from the disk in opposition to the gram load biasing force. The head is said to be "flying" over the disk when in this state.

Within the HDA, the spindle motor rotates the disk or disks, which are the media to and from which the data signals are transmitted via the read write/head on the gimbal attached to the load beam. The transfer rate of the data signals is a function of rotational speed of the spindle motor; the faster the rotational speed, the higher the transfer rate. A spindle motor is essentially an electromagnetic device in which the electromagnetic poles of a stator are switched on & off in a given sequence to drive a hub or a shaft in rotation.

There is huge market potential for putting small form factor disk drives into hand held devices such as cell phones, audio players, PDA, etc. These devices have traditionally used solid-state flash memory to enable their applications. However, flash memory is costly and inherently limited in its storage capacity. Magnetic disk drives, therefore, have emerged as the preferred storage medium for many hand held and mobile devices.

As developed above, disk drives are mechanical in nature and include a rotating disk and moving heads. Accordingly, the robustness of such devices and their ability to survive even moderately severe shock events are justified concerns. Conventionally, such hand held or mobile devices have relied upon various sensors such as accelerometers to detect the shock event (occasioned by a drop, for example) and prepare the device for impact and to regulate spindle rotation, the control signals required to stay on track and the back EMF of motors, for example. However, these sensors are only conventionally operational when there is power to the device. If the hand held or mobile host device is turned off, the device could suffer a shock event, the disk drive (or other constituent components) thereof damaged, and the above-described powered sensors would be ineffective to warn the drive or to initiate special testing to ensure that it is still safe to store data on the drive.

From the foregoing, it may be appreciated that there is a need for disk drives and mobile host devices that include shock sensors that are operational even when the power to the drive or to the host is turned off. This need is all the more pronounced in the case of mobile host devices, as power consumption is often a key consideration in their design.

SUMMARY OF THE INVENTION

Accordingly, this invention may be regarded as a mobile host device, comprising a memory device, the memory device being configured to receive a shock event signal; a shock sensor coupled to the memory device and configured to generate the shock event signal, the shock sensor including: a magnet defining a first region that is magnetized in a first polarization direction and defining a second region that is magnetized in a second polarization direction; a fixed sensor assembly coupled to the first region of the magnet and magnetized in the first polarization direction; a movable sensor assembly coupled to the second region of the magnet and magnetized in the second polarization direction, the movable sensor assembly being configured to: remain out of contact with the fixed sensor assembly as long as the shock sensor does not undergo a shock event equal to or greater than a predetermined magnitude and to contact the fixed sensor assembly and change the level of the shock event signal when the shock sensor undergoes a shock event equal to or greater than the selected magnitude and to remain in contact with the fixed sensor assembly.

The memory device may be further configured to carry out a predetermined shock recovery operation depending upon a level of the received shock event signal. The mobile host device may further include a reset circuit coupled to the magnet and the movable sensor assembly may be further configured to remain in contact with the fixed sensor assembly until reset by the reset circuit. The reset circuit may include a selectively energizable electromagnet configured to generate a magnetic field counter to that of the magnet. The memory device may include spinning media. For example, the memory device may include a magnetic disk drive. One or more spring members may be coupled to the movable sensor assembly. The spring member(s) may be configured to keep the movable sensor assembly from contacting the fixed sensor assembly until the shock sensor undergoes the shock event that is equal to or greater than the predetermined magnitude. At least a portion of the shock sensor may be fabricated using MEMS processes.

According to another embodiment thereof, the present invention is a disk drive that includes a disk; a spindle motor for rotating the disk; a head stack assembly for reading from and writing to the disk; a controller for controlling the disk drive, and a resetable shock sensor coupled to the controller printed circuit board and configured to generate the shock event signal, the resetable shock sensor including: a magnet defining a first region that may be magnetized in a first polarization direction and defining a second region that may be magnetized in a second polarization direction; a reset circuit coupled to the magnet; a fixed sensor assembly coupled to the first region of the magnet and magnetized in the first polarization direction; a movable sensor assembly coupled to the second region of the magnet and magnetized in the second polarization direction, the movable sensor assembly being configured to remain out of contact with the fixed sensor assembly as long as the resetable shock sensor does not undergo a shock event equal to or greater than a predetermined magnitude and to contact the fixed sensor assembly and change the level of the shock event signal when the resetable shock sensor undergoes a shock event equal to or greater than the selected magnitude and to remain in contact with the fixed sensor until reset by the reset circuit.

The memory device may be further configured to carry out a predetermined shock recovery operation depending upon a level of the received shock event signal. A reset circuit may be coupled to the magnet and the movable sensor assembly may be further configured to remain in contact with the fixed sensor assembly until reset by the reset circuit. The reset circuit may include a selectively energizable electromagnet that may be configured to generate a magnetic field counter to that of the magnet. The memory device may include spinning media. For example, the memory device may include a magnetic disk drive. A spring member may be coupled to the movable sensor assembly, the spring member being configured to keep the movable sensor assembly from contacting the fixed sensor assembly until the shock sensor undergoes the shock event that may be equal to or greater than the predetermined magnitude. One or more of the structures of the shock sensor may be fabricated using MEMS processes.

According to still further embodiments, the present invention may also be viewed as a mobile host device, including a memory device, the memory device being configured to receive a shock event signal; a shock sensor coupled to the memory device and configured to generate the shock event signal, the shock sensor including: a fixed portion; a movable portion responsive to shock events, the movable portion being configured to remain out of contact with the fixed portion until the mobile host device may be subjected to a shock event greater than a predetermined magnitude and to contact and remain in contact with the fixed portion and to generate the shock event signal after the mobile host device may be subjected to a shock event greater than the predetermined magnitude.

The memory device may be further configured to carry out a predetermined shock recovery operation depending upon a level of the received shock event signal. The shock sensor further may include a reset circuit and the movable portion may be further configured to remain in contact with the fixed portion until reset by the reset circuit. The shock sensor may be configured such that a magnetic force maintains the movable portion in contact with the fixed portion after the mobile host device may be subjected to a shock event greater than the predetermined magnitude. The shock sensor may be configured such that a mechanical latch maintains the movable portion in contact with the fixed portion after the mobile host device is subjected to a shock event greater than the predetermined magnitude. The shock sensor further may include a reset circuit to break the contact of movable portion with the fixed portion after the mobile host device has been subjected to a shock event greater than the predetermined magnitude. The memory device may include spinning media. For example, the memory device may include a magnetic disk drive. At least a portion of the shock sensor may be fabricated using MEMS processes. The foregoing and other features of the invention are described in detail below and set forth in the appended claims.

DESCRIPTION OF THE PREFERRED EMBODIMENTS

Figure 1:
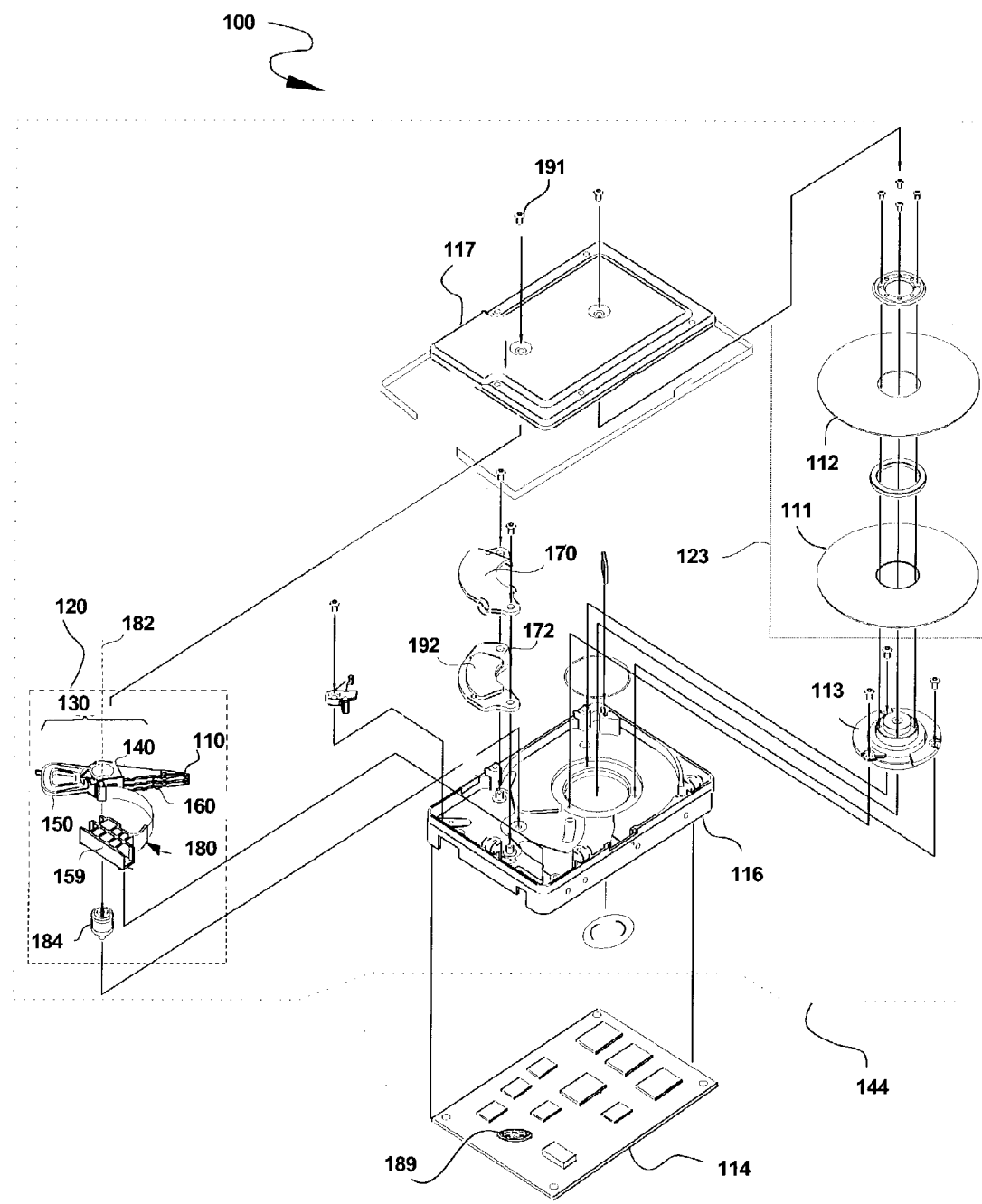
FIG. 1 is an exploded view of a disk drive incorporating a shock sensor according to an embodiment of the present invention.

FIG. 1 shows the principal components of a disk drive such as a magnetic hard disk drive 100 constructed in accordance with this invention. With reference to FIG. 1, the preferred disk drive 100 is an integrated drive electronics (IDE) drive comprising a Head Disk Assembly (HDA) 144 and a Printed Circuit Board Assembly (PCBA) 114.

The HDA 144 includes a base 116 and a cover 117 attached to the base 116 that collectively house a disk stack 123 that includes a plurality of magnetic disks (of which only a first disk 111 and a second disk 112 are shown in FIG. 1), a spindle motor 113 attached to the base 116 for rotating the disk stack 123, a head stack assembly (HSA) 120, and a pivot bearing cartridge 184 (such as a stainless steel pivot bearing cartridge, for example) that rotatably supports the HSA 120 on the base 116. Preferably, the spindle motor 113 rotates the disk stack 123 at a constant angular velocity about a spindle motor rotation axis 175. The preferred HSA 120 comprises a swing-type or rotary actuator assembly 130, at least one Head Gimbal Assembly HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 with a head located at or near its far distal end that is biased toward and moveable over the disks 111, 112. The flex cable assembly 180 includes a flex circuit cable and a flex clamp 159. The HSA 120 is pivotally secured to the base 116 via the pivot-bearing cartridge 184 so that the head(s) at the distal end of the HGA 110 may be moved over the recording surface(s) of the disks 111, 112. The pivot-bearing cartridge 184 enables the HSA 120 to pivot about a pivot axis, shown in FIG. 1 at reference numeral 182. The storage capacity of the HDA 144 may be increased, as shown in FIG. 1, by including additional disks in the disk stack 123 and by an HSA 120 having a vertical stack of HGAs 110 supported by multiple actuator arms 160. The disk drive 100 includes a shock sensor 189 in accordance with embodiments of the present invention. Although the shock sensor 189 is illustrated in FIG. 1 as being coupled to the PCBA 114, it may be alternatively coupled to other structures of the disk drive 100 with equal advantage.

Figure 2:
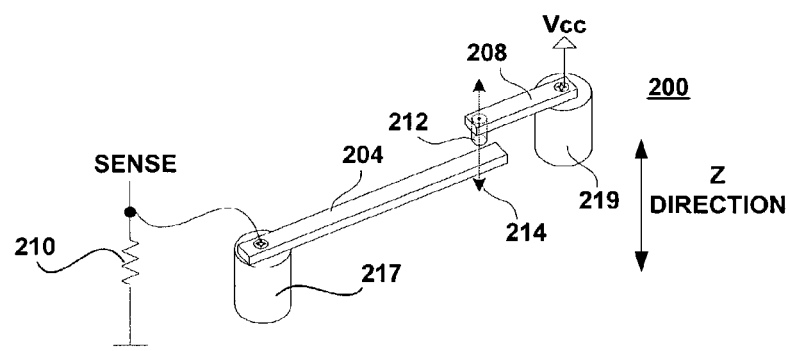
FIG. 2 shows an embodiment of a one-axis shock sensor according to an embodiment of the present invention.

FIG. 2 shows a first embodiment of a shock sensor according to the present invention. The shock sensor 200 of FIG. 2 may include a magnet 212 that defines a first region that is magnetized in a first polarization direction (e.g., South) and that defines a second region that is magnetized in a second polarization direction (e.g., North). A fixed sensor assembly 208 may be coupled (e.g., attached) to the first region of the magnet 212 and may, therefore, be magnetized in the first polarization direction (South in the example developed here). A movable sensor assembly 204 may be disposed close to, but out of contact with the magnet 212. More specifically, the movable sensor assembly 204 may include a cantilevered member formed of or including a (preferably elastic) magnetic material, such as iron or an iron alloy such as steel, for example. The fixed sensor assembly 208 may also include or be formed of a similar magnetic material. Alternatively, both the fixed sensor assembly 208 and the movable sensor assembly 204 may be made or formed of a non-magnetic material. In that case, the movable sensor assembly 204 includes a magnetic element that faces the magnet 212 and contacts the magnet 212 when the sensor is subjected to a shock event of at least the selected magnitude. The movable sensor assembly 204 is configured to remain out of contact with the magnet 212 as long as the shock sensor 200 does not undergo a shock event equal to or greater than a predetermined (and selectable) magnitude. The shock sensor 200 is also configured such that the movable sensor assembly 204 contacts the magnet 212 when the shock sensor 200 undergoes a shock event equal to or greater than the selected magnitude. When the sock sensor 200 is subjected to such a shock event, the movable sensor assembly 204 contacts the magnet 212 and remains in contact with the magnet 212. The embodiment of the shock sensor according to the present invention shown in FIG. 2 operates to detect shock events comprising a component greater than the selected magnitude that is directed in the direction indicated by arrow 214. In FIG. 2, this direction is labeled as the z-direction. To detect shock events directed in other directions, at least two more such shock sensors 200 may be necessary, thereby providing shock detection in the x, y and z directions. The embodiment of the shock sensor 200 of FIG. 2 may include a first support 217 that is configured to support the movable sensor assembly 204 and a second support 219 that is configured to support the fixed sensor assembly 208.

The shock sensor 200 of FIG. 2 is configured such that the movable sensor assembly is subjected to a force occasioned by the shock event and deflected under the influence of this force. When the magnitude of the shock event results in a force on the movable sensor assembly 204 that causes the movable sensor assembly 204 to deflect by a sufficient distance, the magnetic attractive forces between the magnet 212 and the movable sensor assembly 204 will cause the movable sensor assembly to contact and remain in contact with the magnet 212. The movable sensor assembly 204 will thereafter remain in contact with the magnet 212 until physically separated by mechanical, electrical or other means. The shock sensor 200, in this regard, operates as a mechanical latch memory, in that inspection of the shock sensor will reveal whether a shock event of at least the predetermined magnitude has occurred in the past. That is, if the movable sensor assembly 204 is in contact with the magnet 212, a shock event of at least the selected magnitude has occurred.

The material, dimensions, configuration and relative positions of the fixed sensor assembly 208, the movable sensor assembly 204 and the magnet 212 may be chosen according to the desired shock event magnitude the shock sensor 200 is to detect. For example, the material, dimensions, configuration and relative positions of the fixed sensor assembly 208, the movable sensor assembly 204 and the magnet 212 may be chosen such that the movable sensor assembly 204 contacts the magnet 212 only after the shock sensor 200 is subjected to a shock event of a magnitude of 500 g's (on Earth, one g is an acceleration of about 9.8 m/s$^2$) Preferably, the movable sensor assembly 204 remains in contact with the magnet 212 even when the shock sensor 200 is later subjected to a shock event whose magnitude is greater than the selected magnitude. That is, in the example herein, the movable sensor assembly 204 preferably remains in contact with the magnet 212 even after the shock sensor is subjected to a later occurring shock event having a magnitude as high as, for example, 1,000 or 1,500 g's. In this manner, a later occurring shock event may not release or de-latch the movable sensor assembly 204 from contact with the magnet 212. This enables inspection of the shock sensor 200 to reliably indicate the past occurrence of a shock event of at least the elected magnitude, without the uncertainty that a later occurring shock event may have reset the shock sensor.

The shock sensor 200 of FIG. 2 may be configured to generate a shock event signal whenever the sensor 200 is subjected to a shock event having a magnitude greater than the selected magnitude. For example, the fixed sensor assembly 208 and the movable sensor assembly 204 may include or may be formed of a conductive material and a continuity test may be carried out to detect electrical conduction between the fixed sensor assembly 208 and the movable sensor assembly 204. For example, as shown in the embodiment illustrated in FIG. 2, the fixed sensor assembly 208 may be coupled to a first voltage potential (Vcc) and the movable sensor assembly 204 may be coupled to a reference voltage (such as ground, for example). A resistive load 210 may be interposed between the reference potential and a sense node. In this manner, until a shock event of the desired magnitude is encountered, the sense node will be at the reference voltage. After the shock sensor 200 is subjected to a shock event that causes the movable sensor assembly 204 to contact the magnet 212, the sense node is at the first voltage potential, thereby electrically indicating that a shock event of at least the selected magnitude has occurred. The voltage at the sense node may, therefore, act as a shock event signal, the magnitude level of which being indicative of the past presence or absence of a shock event of a selected magnitude. Such sensing may be carried out, for example, when the device incorporating the present shock sensor is powered up.

The embodiment of FIG. 2 is but one possible configuration of such a shock sensor. For example, the magnet 212 need not necessarily be attached to the fixed sensor assembly 208, but may, instead be attached to the movable sensor assembly 204. Alternatively still, the magnet 212 may be disposed such that its first region that is magnetized in a first polarization direction (e.g., South) is coupled to the fixed sensor assembly 208 and such that its second region that is magnetized in a second polarization direction (e.g., North) is coupled to the movable sensor assembly 204 (or vice-versa). Toward such end, a U-shaped magnet may be advantageously used, one free end thereof being attached to the movable sensor assembly 204 and the other free end thereof being attached to the fixed sensor assembly 208. In this manner, when the shock sensor 200 is subjected to a shock event of at least the selected magnitude, the movable sensor assembly 204 is deflected past the point where the magnetic attractive forces between the two elements 204, 208 overcomes the tendency of the movable sensor assembly 204 to resiliently return to its natural, un-deflected state. As the movable sensor assembly 204 and the fixed sensor assembly 208 are oppositely magnetized, they will contact one another and remain in contact until separated. Such separation may also be effected by applying an electric field sufficient to overcome the attractive forces of the magnet 212 and the movable sensor assembly 204 or between the fixed sensor assembly 208 and the movable sensor assembly 204.

Figure 3:
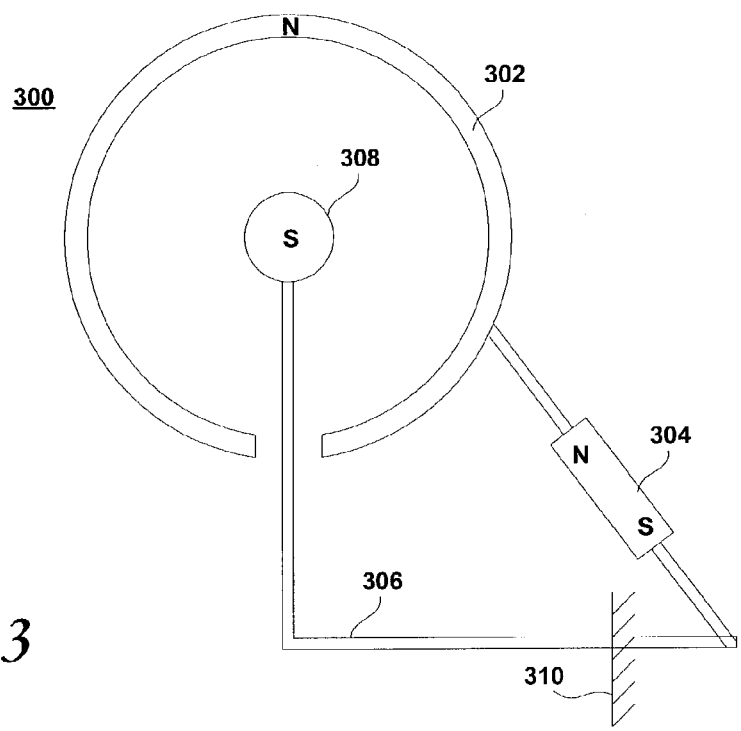
FIG. 3 is a conceptual representation of a tri-axial shock sensor according to an embodiment of the present invention.

FIG. 3 is a conceptual representation of a tri-axial shock sensor 300 according to another embodiment of the present invention. As shown, the sensor 300 includes a magnet 304 that defines a first region that is magnetized in a first polarization direction (e.g., North) and that defines a second region that is magnetized in a second polarization direction (e.g., South). In this embodiment, the fixed sensor assembly 302 is coupled to the first region of the magnet 304 and is magnetized in the first polarization direction (e.g., North). The fixed sensor assembly 302, in this embodiment, defines a volume within which the movable sensor assembly 306 can move under the influence of forces occasioned by shock events. The movable sensor assembly 306, for example, may be elastically deformable and may be formed of a magnetic wire that has a uniform flexibility if bent in any direction. The movable sensor assembly 306 is coupled to the second region of the magnet 304 and is thus polarized in the second polarization direction (e.g., South). A mass 308 of magnetic material may be attached at the end of the movable sensor assembly 306, the mass 308 being free to deflect within the volume defined by the fixed sensor assembly 302. The movable sensor assembly 306 may be secured to a chassis or other stiff assembly, as indicated at 310. The geometry selected for the movable sensor assembly 306 (including the mass 308 at the end thereof within the volume defined by the fixed sensor assembly 302) may be freely selected according to the magnitude of the shock event the sensor 300 is to detect. According to this structure, a movable sensor assembly 306 is magnetically polarized in a first direction and a fixed sensor assembly 302 is polarized in a second magnetic direction. When a shock event of sufficient magnitude occurs, the mass 308 of the movable sensor assembly 306 deflects from a configuration in which the movable sensor 306 does not contact the fixed sensor assembly 302 to a configuration in which the movable sensor assembly 306 contacts the fixed sensor assembly 302 under the influence of the force imparted thereon by the shock event. The sensor 300, therefore, indicates a past occurrence of a shock event of a magnitude at least equal to a selected (designed for) magnitude. According to embodiments of the present invention, the fixed sensor assembly 302 may be formed as a wire cage or hollow sphere (for example), to enable the mass 308 of the movable sensor assembly to contact it irrespective of the direction of the deflection. Note that the sensor 300 of FIG. 3 does not require any applied power to operate.

Figure 4:
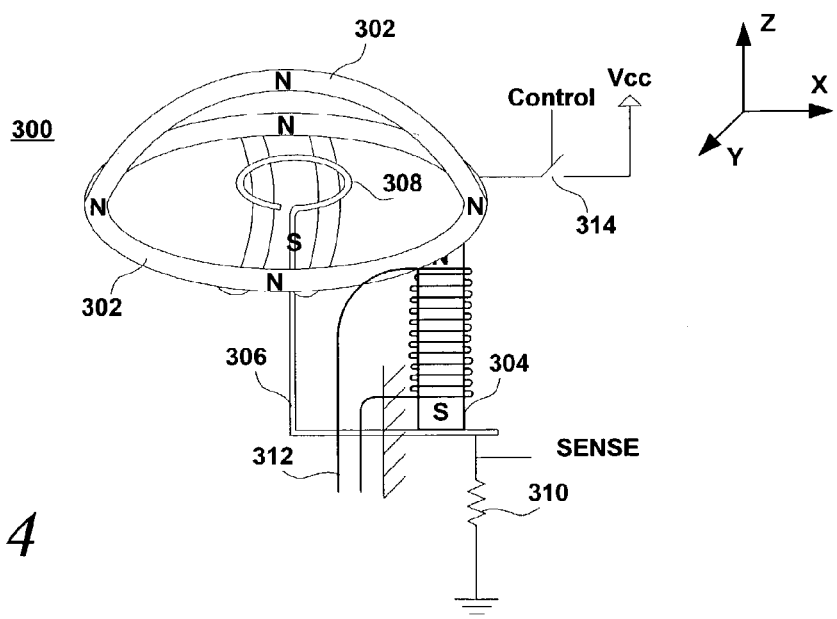
FIG. 4 shows an embodiment of a tri-axial resetable shock sensor according to an embodiment of the present invention.

FIG. 4 shows an embodiment of a tri-axial resetable shock sensor according to an embodiment of the present invention. In this embodiment, the fixed sensor assembly 302 is a wire cage that defines an interior volume. The mass 308 at the end of the movable sensor assembly 306, in this embodiment, is a wire loop disposed within the volume defined by the fixed sensor assembly 302. As in FIG. 2, the fixed sensor assembly 302 is magnetically polarized in a first direction (e.g., North) and the movable sensor assembly 306 is magnetically polarized in a second direction (e.g., South) by a magnet 304. During a shock event, the mass 308 will deflect due to acceleration forces. If the mass 308 deflects a sufficient distance, it will be latched to the cage by magnetic forces. To detect whether the mass 308 has contacted the fixed sensor assembly 302, the conductivity (for example) between the fixed sensor assembly 302 and the movable sensor assembly 306 may be tested. For example, a voltage potential Vcc may be connected to the fixed sensor assembly 302 and a resistive load 310 may be coupled between the movable sensor assembly 306 and a reference voltage potential (e.g., ground). The magnitude of the voltage appearing at the sense node may represent a shock event signal, as it may be used to indicate whether the sensor 300 has been subjected to a shock event sufficient to latch the movable sensor assembly 306 to the fixed sensor assembly 302. Since it may not be necessary or desirable to apply Vcc to the fixed sensor assembly 302 continuously, a controllable switch 314 (such as a transistor, for example) may be disposed between the Vcc source and the fixed sensor assembly 302. When it is desired to test whether the sensor 300 has been subjected to a shock event of a magnitude greater than the selected magnitude, the switch 314 may be closed, the Vcc source connected to the fixed sensor assembly 302 and the resulting voltage measured at the sense node.

To disengage the movable sensor assembly 306 from contact with the fixed sensor assembly 302 after a shock event sufficient to cause the movable sensor assembly 306 to contact the fixed sensor assembly 302, a reset circuit may be employed. According to an embodiment of the present invention, the reset circuit may be coupled to the magnet 304 and may include a wire 312 coiled around the magnet 304. The ends of the wire 312 may then be coupled to a power source, thereby creating an electromagnet. The current applied to the wire 312 may be directed in such a manner as to create an electromagnet having magnetic poles that are opposite to those of the magnet 304. By applying a magnetic field counter to that applied to the movable and fixed sensor assemblies 306, 302 by the magnet 304, the force keeping the movable sensor assembly 306 in contact with the fixed sensor assembly 302 may be diminished to the point or past the point where the restorative spring force of the movable (and elastic) sensor assembly 306 overcomes that of the magnetic force, thereby effectively de-latching the movable sensor assembly 306, which then returns to a state in which it is again out of contact with the fixed sensor assembly 302, as shown in FIG. 4. The movable sensor assembly 306 is then free to move with within the volume defined by the fixed sensor assembly 302 under the influence of later-occurring shock events. The fixed sensor assembly 302 is advantageously formed so as to contact the movable sensor assembly 306 irrespective of the direction in which it deflects as a result of a shock event. In this manner, the sensor 300 may effectively detect any shock event having any directional component whose magnitude is greater than a selected magnitude. The sensor 300 may also be designed such that forces of differing magnitudes are required to cause the movable sensor assembly 306 to contact the fixed sensor assembly 302 along each of the x, y and z directions.

The reset circuit, however, need not be employed in applications in which resetting the sensor 300 is not necessary. For example, a shock sensor 300 may be installed in a host device and may be used to detect if the host device was ever subjected to a large shock. For example, the device's warrantee may be voided if the sensor 300 indicates that the device was subjected to a large shock event. In such an application, the detection of a shock event is paramount, and resetting the sensor may have little or no value.

Figure 5:
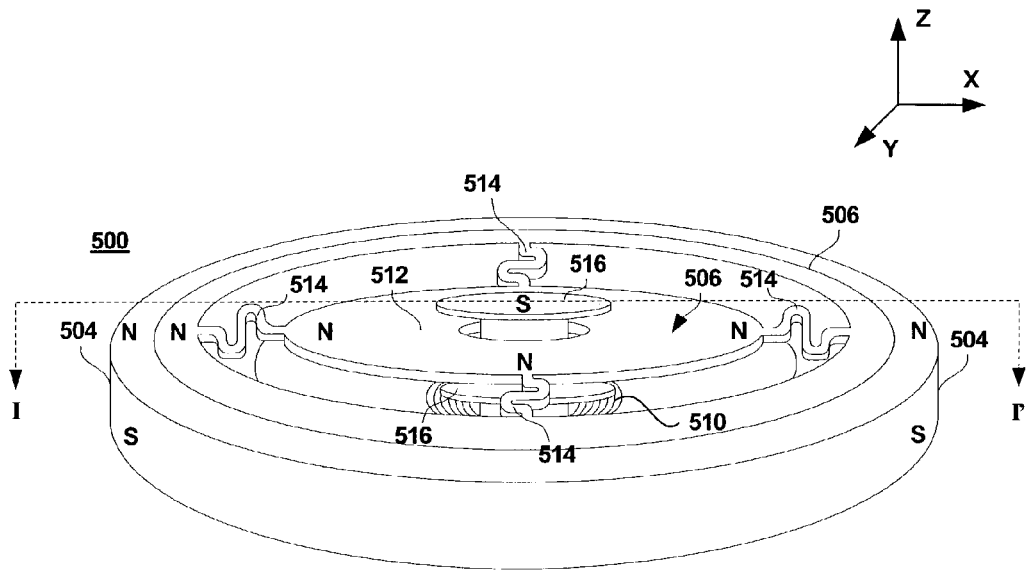
FIG. 5 is a perspective view of a tri-axial resetable shock sensor, according to another embodiment of the present invention.
Figure 6:
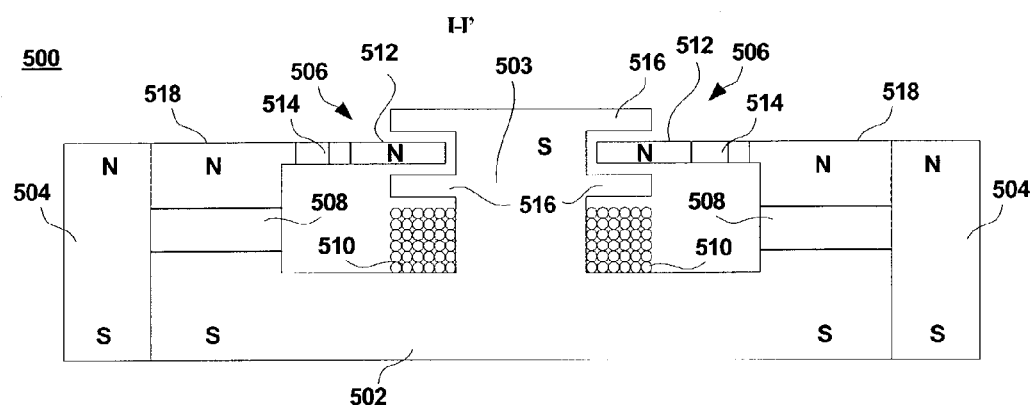
FIG. 6 is a cross-sectional view of the tri-axial resetable shock sensor of FIG. 5, taken along cross-sectional line I–I'.

FIG. 5 is a perspective view of a tri-axial resetable shock sensor, according to another embodiment of the present invention. FIG. 6 is a cross-sectional view of the tri-axial resetable shock sensor of FIG. 5, taken along the cross-sectional line referenced by Roman numeral I–I'. Considering now FIGS. 5 and 6 collectively, a sensor 500 is shown, at least parts of which may be suitable for micro-machining processes, such as those used to create Micro-Electro-Mechanical Systems (MEMS). In MEMS devices, mechanical elements, sensors, actuators, and electronics are integrated on a common silicon substrate through microfabrication technology. While the electronics may be fabricated using integrated circuit (IC) processes (e.g., CMOS, Bipolar, or BiCMOS processes), the micromechanical components may be formed on the same or a different substrate using compatible micromachining processes that selectively etch away parts of the substrate or add new structural layers to form the mechanical and electromechanical devices.

The sensor 500 of FIGS. 5 and 6 includes a magnet 504 that defines a first region that is magnetized in a first polarization direction (the magnetic domains in the first region of the magnet 504 are predominantly aligned in a direction that is referred to as North in FIGS. 5 and 6) and that defines a second region that is magnetized in a second polarization direction (South in FIGS. 5 and 6) that is opposite from the first polarization direction. As shown, the magnet 504 may be shaped, for example, as a right cylinder. Disposed within the inner circumference of the magnet 504 is the fixed sensor assembly 502. The fixed sensor assembly 502 may be formed from a soft magnetic material, such as, for example, a nickel-iron alloy. The fixed sensor assembly 502 may be coupled to the second region of the magnet 504 that is magnetized in the second polarization direction (e.g., South). According to an embodiment of the present invention, the fixed sensor assembly 502 may include a central leg 503 that is also magnetized in the second polarization direction (e.g., South in FIGS. 5 and 6). Extending from the central leg 503 is a pair of plates 516 that are separated from each other in a direction that is parallel to the longitudinal axis of the central leg 503 of the fixed sensor assembly 502 to define an interstitial space therebetween. A soft magnetic disk member or annulus 512 may be suspended such that the outer peripheral edge thereof is disposed within the interstitial space created by the pair of plates 516. A soft magnetic support 518 may be coupled to the first region of the magnet 504 and may also magnetized in the first polarization direction (e.g., North). To elastically support the disk member 512 within the interstitial space defined by the pair of plates 516, and to allow for deflection of the disk member 512 under the influence of a shock event, spring members 514 may be formed with the support 518 and the disk member 512. As best shown in FIG. 5, the spring members 514 may be formed as serpentine springs through a selective etching and masking processes and may be formed of the same soft magnetic material (preferably nickel-iron) as is the support 518 and the disk member or annulus 512. Such spring members 514 are preferably resiliently deformable in the x, y and z directions. In the embodiment of the present invention illustrated in FIGS. 5 and 6, the support(s), the spring member(s) 514 and the disk or annulus 512 collectively form the movable sensor assembly 506. The movable sensor assembly 506 is magnetized in the first polarization direction, by virtue of being attached to the support 518, which is itself attached to the first region of the magnet 504. The fixed sensor assembly 502 is magnetized in the second polarization direction, by virtue of being attached to the second region of the magnet 504. A gap 508 may be defined between the support 518 and the fixed sensor assembly 502, to prevent the support 518 from being magnetized in the first polarization direction.

A reset circuit may also be coupled to the sensor 500. The reset circuit, in this case, includes a wire 510 coiled around the central leg 503 of the fixed sensor assembly 502. The wire 510 may be coupled to a power supply and may be configured to create an electromagnet adapted to de-latch the movable sensor assembly 506 from the fixed sensor assembly 502, as described relative to FIG. 4.

In the absence of a shock event of a lesser magnitude than the designed-for selected magnitude, the sensor 500 is in a configuration in which the disk member 512 does not contact either of the plates 516 or the central leg 503. That is, the attractive forces between the oppositely magnetized plates 516 and disk member 512 are of an insufficient magnitude to overcome the spring forces of the spring member(s) 514. If the sensor 500 is subjected to a shock event of sufficient magnitude (by being dropped or impacted, for example), the disk member 512 will be deflected either against one of the plates 516 (in the case of a shock event directed in the z-direction) and/or against the central leg 503 of the fixed sensor 502 (in the case of a shock event direction in the x or y directions). In either event, as the disk member 512 is deflected, the forces exerted by the spring members 514 are overcome by the magnetic attraction between the oppositely magnetized disk member 512 and fixed sensor assembly 502 and plates 516. The disk member 512 is deflected against and contacts the plates 516 and/or the central leg 503 of the fixed sensor assembly 502 and remains in contact therewith until the sensor is reset. Preferably, once the disk member 512 contacts the plates 516 and/or the central leg 503 of the fixed sensor assembly 502, it will remain in such contact, even when the sensor 500 is later subjected to further shock events, even if such later-occurring shock events have a greater magnitude than the selected magnitude.

To reset the sensor 500, current may be applied to the coiled wire 510 to create an electromagnet whose magnetic polarities are disposed opposite the magnetic polarities of the sensor 500. The application of current to the wire 510 may, therefore, counter the magnetic force maintaining the disk member 512 in contact with the plates 516 and/or the central leg 503 of the fixed sensor assembly 502, and thus enable the disk member 512 to de-latch and to return the sensor 500 to a state in which the disk member no longer contacts the plates 516 and/or the central leg 503.

To determine whether the disk member 512 is in contact with the plates 516 and/or the central leg 503 of the fixed sensor assembly 502, a conductivity test may be carried out, in the manner described relative to FIGS. 2 and 4, for example. That is, the fixed sensor assembly 502 may be controllably coupled to a voltage source Vcc and a resistive load may be coupled between the movable sensor assembly 506 and a reference voltage, such as ground. By testing the magnitude of the voltage present a sense node coupled to the movable sensor assembly, it may be determined whether the disk member 512 is ion contact with the plates 516 and/or the central leg 503 of the fixed sensor assembly 502.

It is to be noted that the present invention is not limited to magnetic latching of the movable sensor assembly 506 to the fixed sensor assembly 502. Indeed, mechanical latches may also be advantageously used, especially in application in which de-latching the movable sensor assembly from the fixed sensor assembly is not critical.

As discussed above relative to FIG. 1, the present shock sensor or resetable shock sensor may be a constituent part of a magnetic disk drive or other memory device. In such an application, when the shock sensor indicates that the sensor (and thus the drive) has undergone a shock event of a magnitude equal to or greater than the selected magnitude, the drive (or other device with which the present sensor is used) may carry out a predetermined shock recovery operation. As the present shock sensor does not require any applied power to function, the disk drive may test the shock event signal at startup (upon the application of power to the drive) to determine if the drive was subjected to a non-operational shock event greater than the designed-for magnitude. This information may be used during the drive's self test to insure that the drive is still fully operational.

The present sensor may replace conventional shock sensors in a drive or device in which the sensor only operates when the power is on. The present sensor, however, are not only operable when the power to the drive or mobile host device is off. Indeed, if such a shock event occurs during operation of the drive (a so-called operational shock), a write gate may be closed to protect against off-track write operations that could overwrite existing data. Other recovery or damage mitigating operations may also be carried out. Moreover, during operation of the drive, shock events of smaller magnitudes than the selected magnitude may be detected, by monitoring the magnitude of the current developed in the coil 510 as the movable sensor assembly 506 vibrates within the magnetic field of the magnet 504. The magnitude of the current induced within the coil 510 will be proportional to the amplitude of the shock to which the sensor is subjected.

Figure 7:
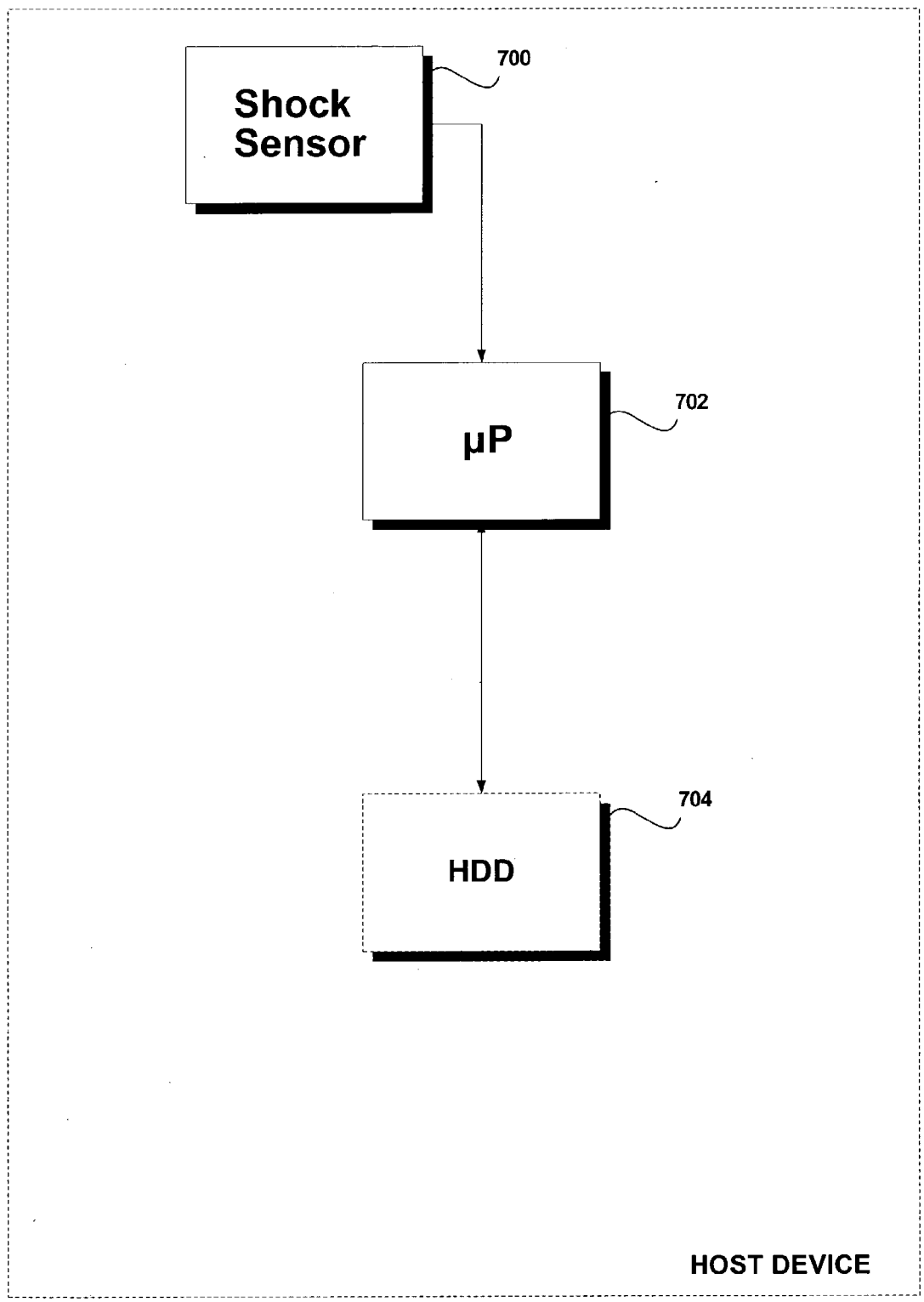
FIG. 7 shows a host device incorporating a shock sensor, according to an embodiment of the present invention.

Embodiments of the present invention find applicability in devices other than magnetic disk drives. Indeed, the present shock sensor and resetable shock sensor may be incorporated in most any host device that would benefit from a detection of a shock event of a magnitude greater than a selected magnitude. Moreover, the fact that the present shock sensors do not consume any power and may be manufactured by micromachining processes may make it an attractive addition to most any host device, especially in mobile host devices (e.g., cameras, personal digital assistants, digital music players, telephones, and the like) in which it is desired to minimize power consumption. FIG. 7 shows such a generic host device incorporating a shock sensor, according to an embodiment of the present invention. As shown, such a host device may include a shock sensor 700 as described herein, a microprocessor or other controller 702 and a memory device, such as disk drive 704.

The embodiments described and shown herein are illustrative and are not intended to limit the scope of the present invention. Those of skill in this art may recognize that modifications of the described embodiments are possible. For example, although sensing contact (or lack thereof) of the movable sensor assembly with the fixed sensor assembly has been described relative to testing for continuity, sensing inductance is also possible. For example, if the disk member 512 is in contact with the central leg 503 of the fixed sensor assembly 502 in FIG. 5, the inductance will be greater than it would otherwise be since the magnetic flux would be greater. Moreover, if inductive sensing is used, such a sensor could also be used during power on operations of the drive or host device and replace conventional accelerometers. Moreover, those of skill in this art may also recognize that as the movable (conductive) sensor assembly vibrates under the influence of small shocks within a magnetic field and movements occasioned by ordinary usage of the disk drive or host device, the flux is switched and will generate a voltage. Such voltage may be used and/or stored to extend the battery life of the host device, for example.

What is claimed is:

1. A mobile host device, comprising:
a memory device, the memory device being configured to receive a shock event signal;
a single tri-axial shock sensor coupled to the memory device and configured to generate the shock event signal, the single tri-axial shock sensor including:
a magnet defining a first region that is magnetized in a first polarization direction and defining a second region that is magnetized in a second polarization direction;
a fixed sensor assembly coupled to the first region of the magnet and magnetized in the first polarization direction;
a movable sensor assembly coupled to the second region of the magnet and magnetized in the second polarization direction, the movable sensor assembly being configured to:
remain out of contact with the fixed sensor assembly as long as the shock sensor does not undergo a shock event equal to or greater than a predetermined magnitude and to
deflect in any of the x, y and z directions to contact the fixed sensor assembly and change the level of the shock event signal irrespective of a direction of the shock event when the shock sensor undergoes a shock event in any direction whose magnitude is equal to or greater than the predetermined magnitude and to remain in contact with the fixed sensor assembly.

2. The mobile host device of claim 1, wherein the memory device is further configured to carry out a predetermined shock recovery operation depending upon a level of the received shock event signal.

3. The mobile host device of claim 1, further comprising a reset circuit coupled to the magnet and wherein the movable sensor assembly is further configured to remain in contact with the fixed sensor assembly until reset by the reset circuit.

4. The mobile host device of claim 3, wherein the reset circuit includes a selectively energizable electromagnet that is configured to generate a magnetic field counter to that of the magnet.

5. The mobile host device of claim 1, wherein the memory device includes spinning media.

6. The mobile host device of claim 5, wherein the memory device includes a magnetic disk drive.

7. The mobile host device of claim 1, further including a spring member coupled to the movable sensor assembly, the spring member being configured to keep the movable sensor assembly from contacting the fixed sensor assembly until the shock sensor undergoes the shock event that is equal to or greater than the predetermined magnitude.

8. The mobile host device of claim 1, wherein at least a portion of the shock sensor is fabricated using Micro-Electro-Mechanical-System (MEMS) processes.

9. A disk drive, comprising:
a disk;
a spindle motor for rotating the disk;
a head stack assembly for reading from and writing to the disk;
a controller for controlling the disk drive, and a single tri-axial resetable shock sensor coupled to the controller printed circuit board and configured to generate the shock event signal, the single tri-axial resetable shock sensor including:
a magnet defining a first region that is magnetized in a first polarization direction and defining a second region that is magnetized in a second polarization direction;
a reset circuit coupled to the magnet;
a fixed sensor assembly coupled to the first region of the magnet and magnetized in the first polarization direction;

a movable sensor assembly coupled to the second region of the magnet and magnetized in the second polarization direction, the movable sensor assembly being configured to:

remain out of contact with the fixed sensor assembly as long as the resetable shock sensor does not undergo a shock event equal to or greater than a predetermined magnitude and to deflect in any of the x, y and z directions to contact the fixed sensor assembly and change the level of the shock event signal irrespective of a direction of the shock event when the resetable shock sensor undergoes a shock event in any direction whose magnitude is equal to or greater than the predetermined magnitude and to remain in contact with the fixed sensor until reset by the reset circuit.

10. The disk drive of claim 9, wherein the memory device is further configured to carry out a predetermined shock recovery operation depending upon a level of the received shock event signal.

11. The disk drive of claim 9, further comprising a reset circuit coupled to the magnet and wherein the movable sensor assembly is further configured to remain in contact with the fixed sensor assembly until reset by the reset circuit.

12. The disk drive of claim 11, wherein the reset circuit includes a selectively energizable electromagnet that is configured to generate a magnetic field counter to that of the magnet.

13. The disk drive of claim 9, wherein the memory device includes spinning media.

14. The disk drive of claim 13, wherein the memory device includes a magnetic disk drive.

15. The disk drive of claim 9, further including a spring member coupled to the movable sensor assembly, the spring member being configured to keep the movable sensor assembly from contacting the fixed sensor assembly until the shock sensor undergoes the shock event that is equal to or greater than the predetermined magnitude.

16. The disk drive of claim 9, wherein at least a portion of the shock sensor is fabricated using Micro-Electro-Mechanical-System (MEMS) processes.

17. A mobile host device, comprising:
a memory device, the memory device being configured to receive a shock event signal;
a single tri-axial shock sensor coupled to the memory device and configured to generate the shock event signal, the single tri-axial shock sensor including:
a fixed portion;
a movable portion responsive to shock events, the movable portion being configured to remain out of contact with the fixed portion until the mobile host device is subjected to a shock event greater than a predetermined magnitude and to defect in any of the x, y and z directions to contact and remain in contact with the fixed portion and to generate the shock event signal irrespective of a direction of the shock event after the mobile host device is subjected to a shock event in any direction whose magnitude is greater than the predetermined magnitude.

18. The mobile host device of claim 17, wherein the memory device is further configured to carry out a predetermined shock recovery operation depending upon a level of the received shock event signal.

19. The mobile host device of claim 17, wherein the shock sensor further comprises a reset circuit and wherein the movable portion is further configured to remain in contact with the fixed portion until reset by the reset circuit.

20. The mobile host device of claim 17, wherein the shock sensor is configured such that a magnetic force maintains the movable portion in contact with the fixed portion after the mobile host device is subjected to a shock event greater than the predetermined magnitude.

21. The mobile host device of claim 17, wherein the shock sensor is configured such that a mechanical latch maintains the movable portion in contact with the fixed portion after the mobile host device is subjected to a shock event greater than the predetermined magnitude.

22. The mobile host device of claim 17, wherein shock sensor further includes a reset circuit to break the contact of movable portion with the fixed portion after the mobile host device is subjected to a shock event greater than the predetermined magnitude.

23. The mobile host device of claim 17, wherein the memory device includes spinning media.

24. The mobile host device of claim 17, wherein the memory device includes a magnetic disk drive.

25. The mobile host device of claim 17, wherein at least a portion of the shock sensor is fabricated using Micro-Electro-Mechanical-System (MEMS) processes.

26. The mobile host device of claim 1, wherein the fixed and movable sensors are configured such that the movable sensor is separated from the fixed movable sensor by first to sixth gaps corresponding to the +x, −x, +y, −y, +z and −z directions respectively, and wherein the movable sensor is configured to deflect to close at least one of the first to sixth gaps and contact the fixed sensor when the shock sensor undergoes a shock event in any direction whose magnitude is equal to or greater than the predetermined magnitude.

27. The disk drive of claim 9, wherein the fixed and movable sensors are configured such that the movable sensor is separated from the fixed movable sensor by first to sixth gaps corresponding to the +x, −x, +y, −y, +z and −z directions respectively, and wherein the movable sensor is configured to deflect to close at least one of the first to sixth gaps and contact the fixed sensor when the shock sensor undergoes a shock event in any direction whose magnitude is equal to or greater than the predetermined magnitude.

28. The mobile host device of claim 17, wherein the fixed and movable portions are configured such that the movable portion is separated from the fixed movable portion by first to sixth gaps corresponding to the +x, −x, +y, −y, +z and −z directions respectively, and wherein the movable portion is configured to deflect to close at least one of the first to sixth gaps and contact the fixed portion when the shock sensor undergoes a shock event in any direction whose magnitude is equal to or greater than the predetermined magnitude.

* * * * *